H. H. KOELLER.
SEED-DROPPER.

No. 173,545. Patented Feb. 15, 1876.

WITNESSES:
E. Wolff
Alex F. Roberts

INVENTOR:
H. H. Koeller
BY
ATTORNEYS.

UNITED STATES PATENT OFFICE.

HERMANN H. KOELLER, OF CAMP POINT, ILLINOIS.

IMPROVEMENT IN SEED-DROPPERS.

Specification forming part of Letters Patent No. 173,545, dated February 15, 1876; application filed October 23, 1875.

*To all whom it may concern:*

Figure 1:
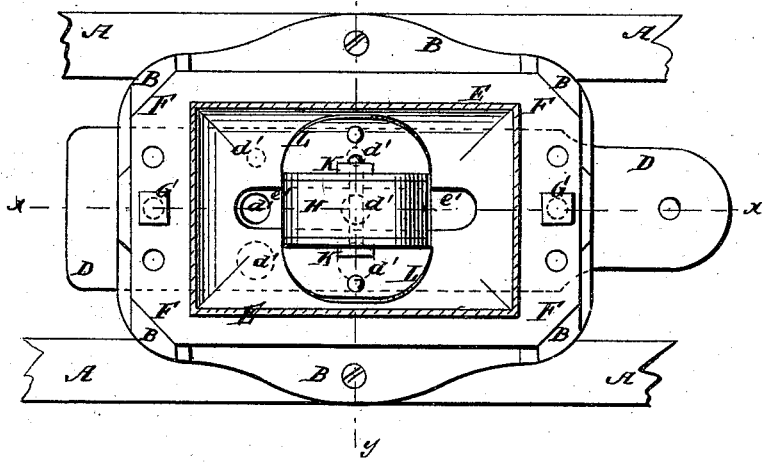
Figure 2:
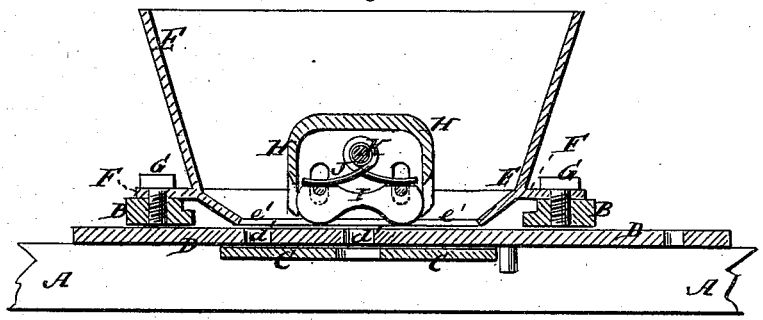
Figure 3:
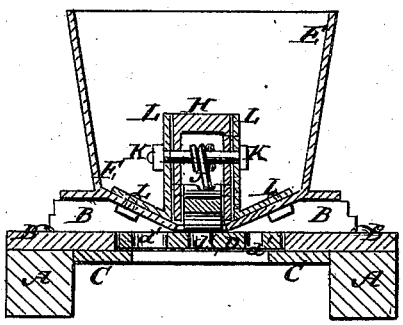

Be it known that I, HERMANN H. KOELLER, of Camp Point, in the county of Adams and State of Illinois, have invented a new and useful Improvement in Seed-Droppers, of which the following is a specification:

Figure 1 is a top view of my improved device. Fig. 2 is a vertical longitudinal section of the same, taken through the line $xx$, Fig. 1. Fig. 3 is a vertical cross-section of the same, taken through the line $yy$, Fig. 1.

Similar letters of reference indicate corresponding parts.

The object of this invention is to furnish an improved device for dropping seed which shall be so constructed that it may be readily adjusted to drop larger or smaller seeds, as may be required, and which will prevent the dropping-slide from carrying out any more seed than enough to fill the dropping-holes of said slide, and which shall be simple in construction, and not liable to get out of order.

The invention consists in combining a centrally-pivoted two-armed spring with a cut-off block, and in making the cut-off of a side-slotted box, a block with side pins, a spring, a bolt, and certain angle-plates, as more particularly hereinafter described.

A represents a portion of the frame-work of a seed-planter.

B is the base-frame of the seed-hopper, the side bars of which project below the end bars, and are securely bolted to the frame A. To the lower side of the middle parts of the side bars of the base-frame B is secured a plate, C, which has a hole formed through its center, through which the seed passes to the ground.

Upon the plate C, and between the side bars of the frame B, is placed the dropping-slide D, which may be operated by any of the well-known means, and through which are formed two transverse rows of two or more holes, $d'$. The holes $d'$ are graduated in size, as shown in Figs. 1 and 3, so that the larger or smaller holes may be used, according as larger or smaller seeds are to be planted, or more or less seed is to be dropped for a hill. E is the hopper, in the bottom of which is formed a slot, $e'$, to allow the seed to pass into the dropping-holes $d'$ of the slide D.

Upon the lower part of the ends of the hopper E are formed flanges F, which may be the projecting ends of the bottom of said hopper E.

The flanges F rest upon the end bars of the base-frame B, and are secured to said end bars by bolts G. In the flanges F are formed as many holes $f'$, to receive the bolts G, as there are holes $d'$ in each row of holes in the dropping-slide D, so that the hopper E may be adjusted laterally to bring its discharge-slot $e'$ over a larger or smaller set of holes, $d'$, in the dropping-slide D, according as the size or quantity of seed to be dropped may require.

H is the cut-off box, in the sides of which are formed short slots to receive pins formed upon the sides of the cut-off block I, which is placed in the cavity of the box H, and the middle part of which is concaved, as shown in Fig. 2.

The upper sides of the end parts of the block I are grooved to receive the arms of the wire spring J, the middle part of which is coiled around a bolt, K, which passes through the box H, and secures the angle-plates L to the sides of the said box.

The lower parts of the angle-plates L are bolted to the bottom of the hopper E. The plates L secure the cut-off in place, and at the same time cover up and protect the slots in the sides of the box H.

By this construction, as the seed is carried in at either end of the cut-off by the slide D, the end of the block I will rise, while the spring J will press the other end of the block I down more firmly, so that it will act as a perfect cut-off, and at the same time will not crush or injure the seed.

Having thus described my invention, I claim as new and desire to secure by Letters Patent—

1. The combination, with covered cut-off block I, constructed as described, of the two-armed spring J, centrally pivoted at K, as shown and described, whereby the pressure on one side is increased whenever the other side is forced upward.

2. A cut-off to be used in connection with hopper and slides, consisting of a side-slotted box, H, block I, having side pins, a spring, J, a bolt, K, and angle-plates L, all arranged as shown and described.

HERMANN H. KOELLER.

Witnesses:
T. J. McCANN,
THOS. F. PIERCE.